United States Patent [19]

Watarai et al.

[11] Patent Number: 4,965,640
[45] Date of Patent: Oct. 23, 1990

[54] IMAGE FORMING APPARATUS INCLUDING DETACHABLE TONER FIXING UNIT

[75] Inventors: Shinichi Watarai, Yokohama; Makoto Inoue, Kobe; Keiji Ohyabu, Tokyo, all of Japan

[73] Assignee: Fujitsu Limited, Kawasaki, Japan

[21] Appl. No.: 321,203

[22] Filed: Mar. 9, 1989

[30] Foreign Application Priority Data

Mar. 14, 1988 [JP] Japan .................. 63-060146

[51] Int. Cl.⁵ .............................. G03G 15/20
[52] U.S. Cl. ................... 355/283; 355/282; 219/216; 432/60
[58] Field of Search ........... 355/283, 282, 200, 210; 219/216, 388; 432/60

[56] References Cited

U.S. PATENT DOCUMENTS

| 4,531,823 | 7/1985 | Deguchi et al. | 355/308 |
| 4,782,359 | 11/1988 | Tomoe | 355/282 |
| 4,806,970 | 2/1989 | Nakatomi et al. | 355/282 |

FOREIGN PATENT DOCUMENTS 62-299982 12/1987 Japan .................. 355/282

Primary Examiner—R. L. Moses
Attorney, Agent, or Firm—Staas & Halsey

[57] ABSTRACT

An image forming apparatus has upper and lower frames. A fixing unit detachably mounted on one frame is provided with a heated roller and a pressure roller. One end of a lever is positioned to be pushed by the other frame when the frames are in a closed condition, and the other end of the lever pushes the pressure roller at both ends of its shaft transversally towards the heated roller so as to pinch therebetween and heat a sheet having a toner image thereon. When the frames are disengaged and moved to their opened condition the pressure on the lever is released, whereupon the pressure roller separates from the heated roller so that the pressure on the sheet is released to facilitate easy removal of the sheet.

14 Claims, 12 Drawing Sheets

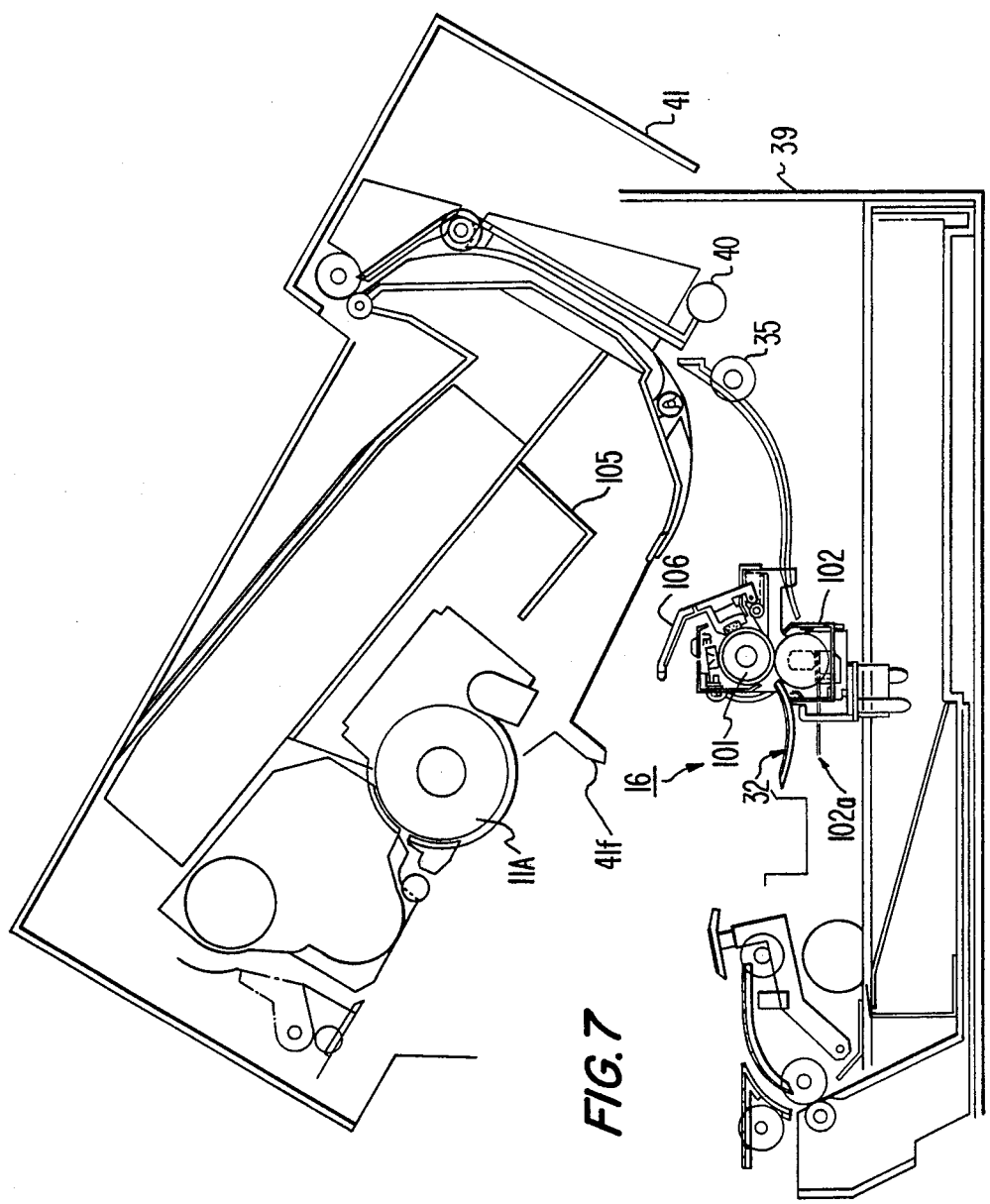

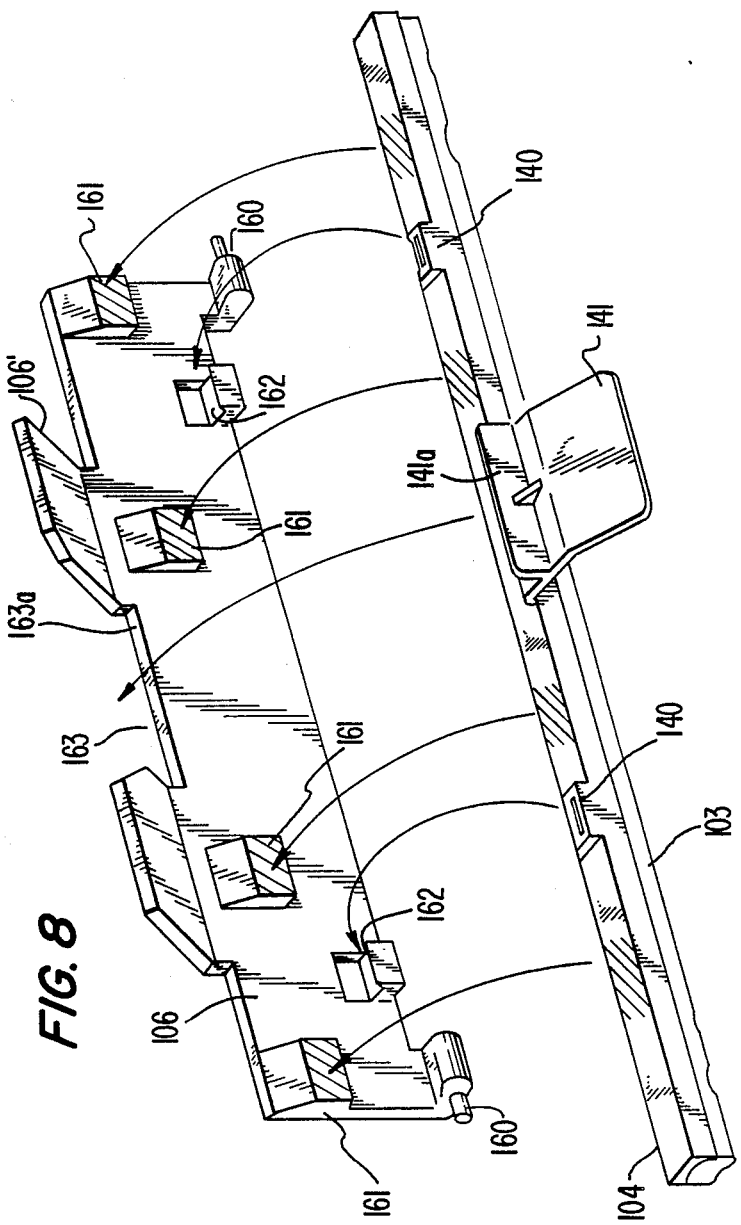

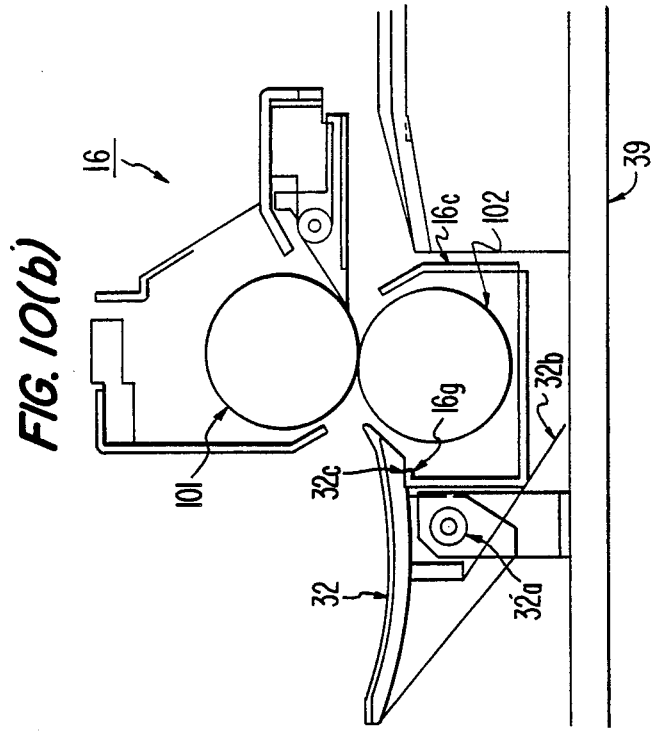
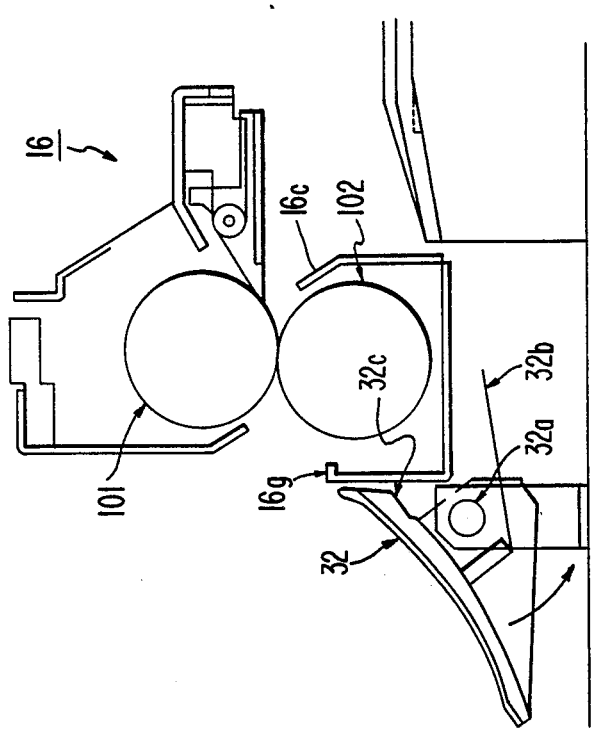

IMAGE FORMING APPARATUS INCLUDING DETACHABLE TONER FIXING UNIT

BACKGROUND OF THE INVENTION

1. Field of the Invention

This invention relates to image forming apparatus used in an electrophotographic printing or copying machine, etc., employing toner to form a toner image on a sheet of paper. More particularly, the invention relates to a detachable fixing unit including rollers for pinching a sheet carrying a toner image thereon so as to fix the toner image on the sheet.

2. Description of the Related Art

In an electrophotographic recording apparatus a toner image is developed on a rotating photosensitive drum corresponding to an image to be recorded according to a well-known technique. A sheet of paper is fed into the apparatus and is brought into contact with the toner image so that the toner image is transferred onto the sheet while the sheet feed speed is synchronized with the speed of the rotating drum surface, according to a well-known technique. The sheet having the toner image thereon is then fed between a pair of parallel rotating rollers of a fixing unit. One of the rollers is generally a heat roller and the other is a backup roller. The rollers are pressed transversally together so that the toner is melted and fixed on the sheet. It has been a typical problem that the image bearing sheet being fed through the rollers will become jammed by the rollers. Therefore, many schemes have been devised for conveniently servicing the rollers, for example, to facilitate removal of the jammed sheets.

The fixing unit having rollers as outlined above may be constructed for axial detachment from a frame of the apparatus, as disclosed in U.S. Pat. No. 4,145,181. Of Edward et al. Problems of encountered in the use of the Edward et al. structure include the fact that the removal of the fixing unit from the frame for servicing is not efficient because the two rollers must be removed together with the jammed sheet pressed between the rollers, and the removal of the sheet is a troublesome operation. Additionally, the mechanism for pressing the rollers together must be included as part of the fixing unit resulting in higher initial cost as well as higher serving cost.

Alternatively, the rollers may be respectively on separate frames, and for servicing the frames are disengaged so as to release the pressure between the two rollers. Such apparatus is disclosed in Japanese Unexamined Patent Publication Sho No. 61-176964 by Fukushima, et al., and in U.S. patent application No. 890511 of Kawashima. The chief problem involved in the use of these structures is that the manipulation needed to remove the rollers from their respective frames for servicing of the rollers is inefficient.

As another previous alternative, the rollers are pressed together only when an upper chassis is engaged with its lower chassis, such as disclosed in Japanese Unexamined patent publication Sho No. 62-299982 of Yamashita, et. al.. The main shortcoming of this structure is that the fixing unit is not detachable from the chassis, and accordingly the servicing of the rollers can not be efficiently carried out.

SUMMARY OF THE INVENTION

It is an object of the invention to provide a compact fixing unit which can be easily mouned onto or removed from the frame the unit is to be installed on.

It is another object of the invention to provide a compact detachable fixing unit from which a jammed sheet of paper can be efficiently removed.

In accordance with the invention, an image forming apparatus is provided. The apparatus includes upper and lower frames, hinge means hingedly interconnecting the frames and facilitating relative movement therebetween between open and closed conditions, and a toner fixing unit detachably mounted on one of the frames. The fixing unit comprises a base structure and a pair of elongated rollers rotatably mounted on the base structure and disposed in parallel contacting relationship for pinches a image recording sheet carrying a toner image therebetween during rotation of the rollers. The fixing unit also comprises pressure means including a contact element that is operable in response to a pressing force applied to the element for pressing the rollers toward one another during their rotation to thereby fix the toner image on the image recording sheet. The fixing unit further includes a first contact member mounted on the other frame for contacting the contact element and applying said pressing force thereto when the frames are in their closed condition. Preferably one of the rollers of the fixing unit will be a heated roller for heating the toner image on the image recording sheet during the rotation of the rollers and the other of the rollers will be a pressure roller comprising an elastic material mounted on a rigid axle.

With such apparatus when the upper and lower frames are moved to their opened condition the pressure on the contact element will be released to thereby release the pressure on the sheet and facilitate efficient removal of the sheet from between the rollers.

The above-mentioned features and advantages of the present invention, together with other objects and advantages, which will become apparent, will be more fully described hereinafter, with reference being made to the accompanying drawings which form a part hereof and wherein like numerals refer to like parts throughout.

BRIEF DESCRIPTION OF THE DRAWINGS

FIG. 2 (b) is a perspective view illustrating the fixing unit of the imate forming apparatus of FIG. 1;

FIG. 7 a side elevational schematic view illustrating the status of the fixing unit of the present invention when the upper and lower frames are in their opened condition;

FIG. 8 is a perspective view illustrating a cleaner case and buffer member that may be used in conjuction with the fixing unit of the present invention;

FIG. 10 (a) illustrates the mutual relatioships betwween the sheet quide of the apparatus of FIG. 1; and the fixing unit during detachement of the latter from the lower frame.

FIG. 10 (b) illustrates the mutual relationships between the sheet guide and the fixing unit during attachement of the latter to the lower frame;

FIG. 11 (b) is a perespective view illustrating the coil spring employed in the embodiment of FIG. 11 (a).

DESCRIPTION OF THE PREFERRED EMBODIMENTS

Figure 1:
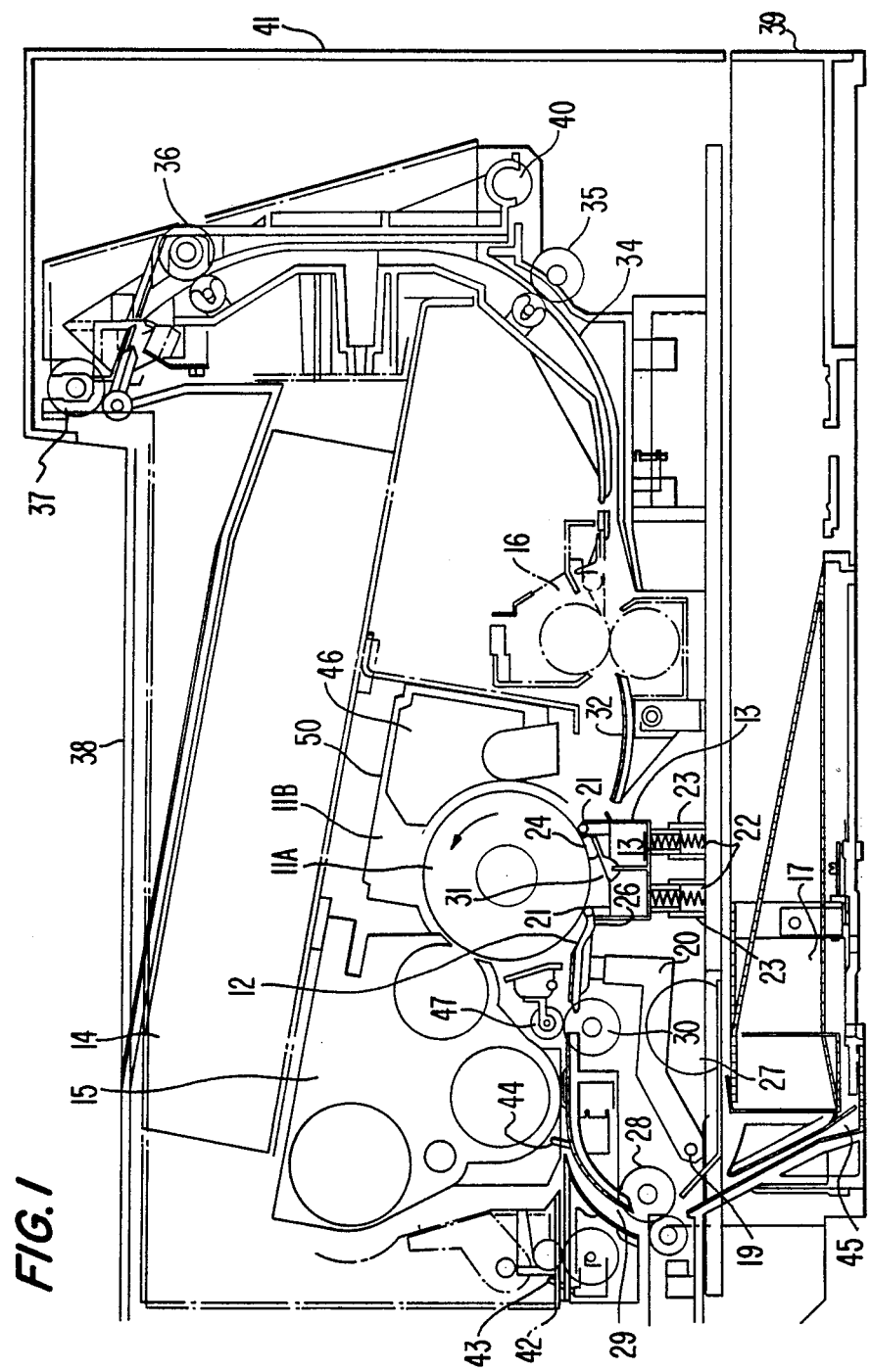
FIG. 1 is a side elevation schematic view illustrating the internal structure of an electrophotographic recording apparatus which includes an image forming apparatus in accordance with the invention.
Figure 2A:
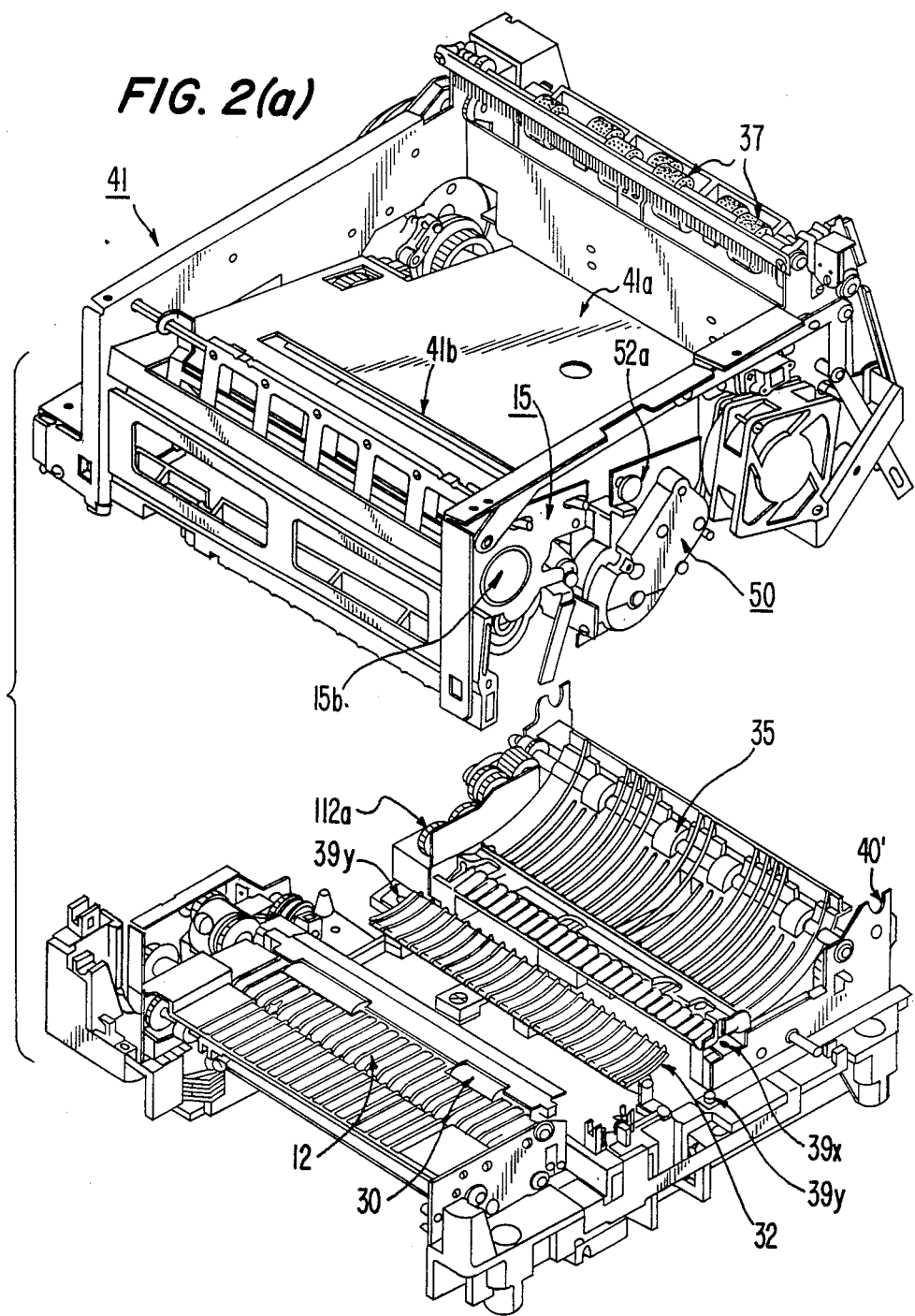
FIG. 2 (a) is an exploded perspective view showing the constitution of the upper and lower frames of the image forming apparatus of the electrophotographic recording of FIG. 1.
Figure 2B:
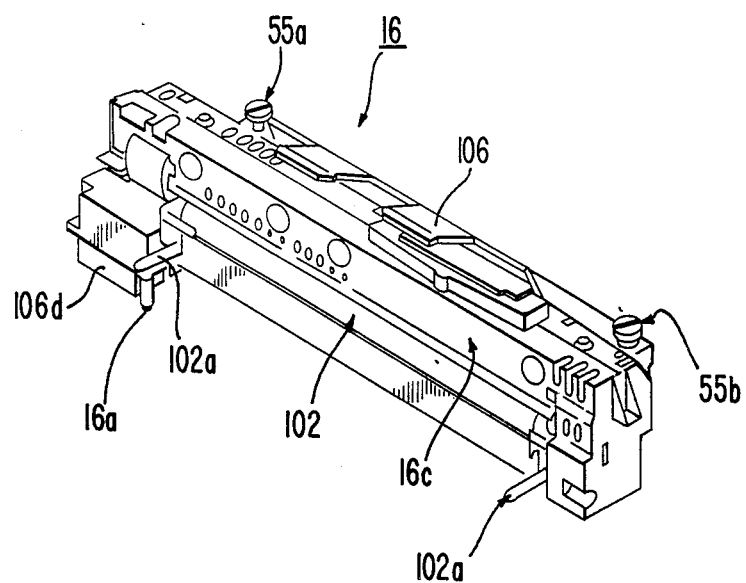

FIG. 1 schematically illustrates the general constitution of a laser printer electrophotographic recording apparatus, for example, which includes an image forming apparatus that embodies the concepts and principles of the present invention. Perspective views of separate components of the printer are shwon in FIGS. 2 (a) through 3. An optical unit 14 includes a semiconductor laser and polygonal mirrors, f-0 lens (neither of which is shown in the figure), where a laser beam is generated and modulated according to information to be recorded, and is scanned and focused on a photosensitive drum 11A to thereby form an electrostatic laten image. The optical unit 14 mounted on a bed 41a. The laser beam is projected through a slit 41b onto the drum 11A. Developer unit 15 supplies toner power to the photosentive drum 11A so that the latent image is developed thereon. A transfer unit 13 includes an electro charger and a AC (alternating current) separator, and is pushed by springs 22 and the guide members 23 via two pairs of rollers 21 towards the photosensitive drum 11A so as to maintain a predetermined clearance between unit 13 and photosensitive drum 11A. Transfer unit 13 electrastically transfers the developed toner image from drum 11A to a sheet fed to the apparatus and attached by an electrostatic force to the drum 11A, is well known. A fixing unit 16 includes heated roller 101 and a pressure roller 102 for pressing herebetween the sheet having the toner image thereon to thereby heat and melt the toner to fix the toner permanently on the sheet. The present invention relates to fixing unit 16, the details of which are described hereinafter.

Cut sheets of paper on which an image is to be recorded are stacked in a sheet cassette 17, where the paper stack (not shown, i.e., the cassette is empty, in the figure) is pushed upwardly. The sheet cassette 17 is provided with a quide slit 45 for allowing a sheet from another sheet cassette (not shown in the figure) to pass therethrough. The sheet cassette 17 is detachable from a lower frame 39 of the electrophotographic recording apparatus towards the left hand side of FIG. 1. A separator roller 27 rotates to push the top sheet of teh sheet stack out of second feed rollers 28, which feed the sheet to third rollers 30 and 47 through a second guide slit 29. Alternatively, a sheet may be manually fed through a manual slit 42 to the third rollers 30 and 47. Sensors 43 and 44 detect a sheet coming in. The roller 30 is pushed against roller 47 which forms a part of a photosensitive drum unit 50 together with the photosensitive drum 11A, a precharger 11B and a cleaner 46 for removing residual toner from the drum 11A. The incoming sheet fed by the third rollers 30 and 47 along a sheet guide 12 to an image transfer region 31 of the transcription unit 13. During this operation roller 30 is rotated in synchronization with the rotation of the photosensitive drum 11A. The sheet guide 12 is supported by an arm 20, which is rotatable around an axle 19, and rests on an edge 26 of the transfer unit 13.

A second sheet guide 32 guides the sheet having the transferred toner image thereon to the fixing unit 16. The sheet coming out of the fixing unit 16 is transported by fourth, fifth and sixth feed roller pairs 35, 36 and 37 and guided through a third guide slit 34 to a stacker 38 for the printed sheets.

Figure 3:
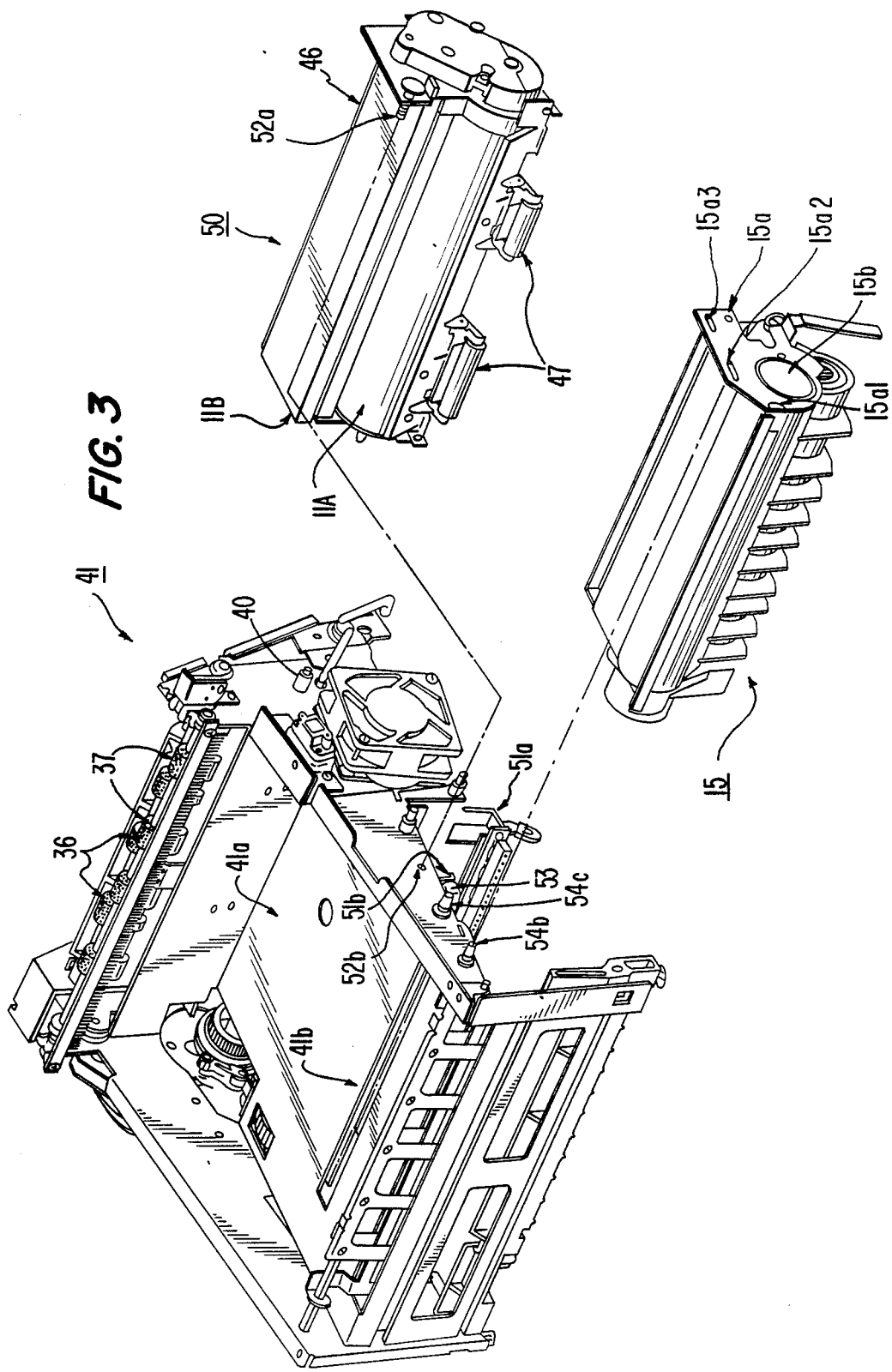
FIG. 3 is is an exploded perspective view illustrating the constitution of the upper frame of the image forming apparatus of the electrophotographic recording apparatus of FIG. 1.

The photosensitive drum unit 50 is installed on upper frame 41 by axially invention along guide rails 51a and 51b (FIG. 3) and the same is fastened to frame 41 with screw 52a extending through screw hole 52b Accordingly, unit 50 is detachable from the upper frame 41 to faciltate servicing. The developing unit 15 is also designed for axial installation and detachment from the upper frame 41 along rails 53, etc. and same is positioned by engagment of guide pins $54_b$ and $54_c$ respectively with holes $15_{a2}$ and $15_{a3}$ provided on a side plate 15a (FIG. 3(a)). Thus, the developer unit 15 is detachable from frame 41 to facilitate replenishment of the two-component developer powder. Replenishment of the supply of toner is carried out by replacing the toner cartridge in a toner cartridge hole 15b as is well-known, while the developer unit 15 remanins in place in the upper frame 41. The upper frame 41 is arranged to face the lower frame 39 when the apparatus is in a closed condition and can be disengaged therefrom by rotation of the upper frame 41 around the axis of an axle 40 functioning as hinge to achieve an open condition, as shown in FIG. 7. The axle 40 is supported in receptacles 40' of the lower frema 39 (FIG. 2(a)). The roller 47, the photosensitive drum 11A, one of the rollers of fourth roller pair 35, and the fifth and sixth pairs of rollers 36 and 37 are installed on the upper frame 41. The third roller 30, the second sheet guide 32, and the other roller of the fourth roller pair 35 are installed on the lower frame 39.

The fixing unit 16 is detachably installed on the lower frame 39. Two holes 16f provided on the bottom of a case 16c of the fixing unit 16 are inserted with pins $39_y$ provided on the lower frame 39 in order to determine the location of the fixing unit 16 on the lower frame 39, and two screws $55_a$ and $55_b$ (FIG. 2(b)) on the fixing unit 16 are screwed into tapped holes $39_x$ (FIG. 2(a)) to fasten the fixing unit 16 to the lower frame 39. A plug 106d makes electrical connections with contacts (not shown in the figure) provided on the lower frame 39, so that electricity maybe supplied to heat a heat lamp 111 in the fixing unit 16 and facilitable output of a signal from a thermosensor 16e. The thermosensor 16e measures the temperature of the heat roller for its temperature control. Two guide plugs $16_a$ and $16_b$ (FIG. 4)

provided on the bottom of the fixing unit 16 and guide holes (not shown in the figure) provided on the lower frame 39 position the plug 106d relative to the contacts on the lower frame 39.

Figure 4:
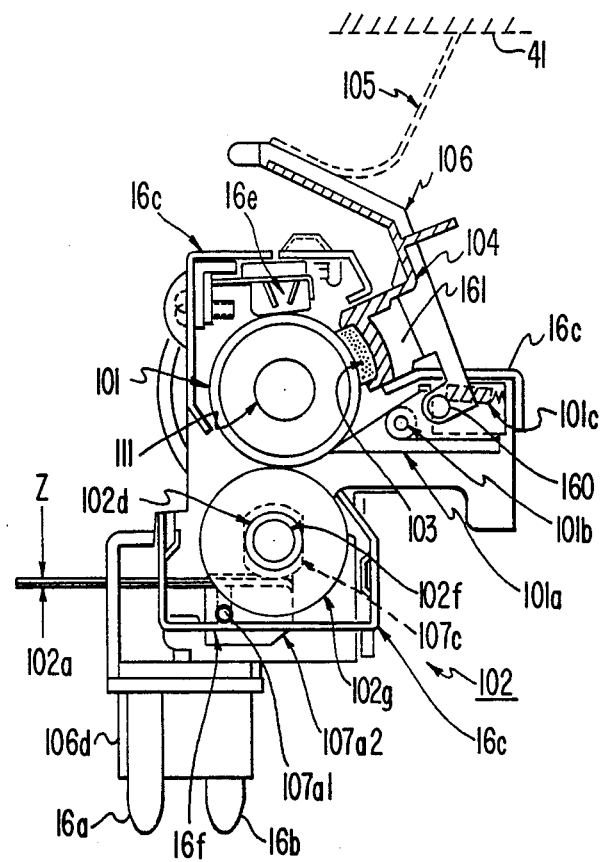
FIG. 4 is a cross-sectional view, taken along a line extending perpendicularly to the axis of rotation of the rollers of the fixing unit of the present invention.
Figure 5:
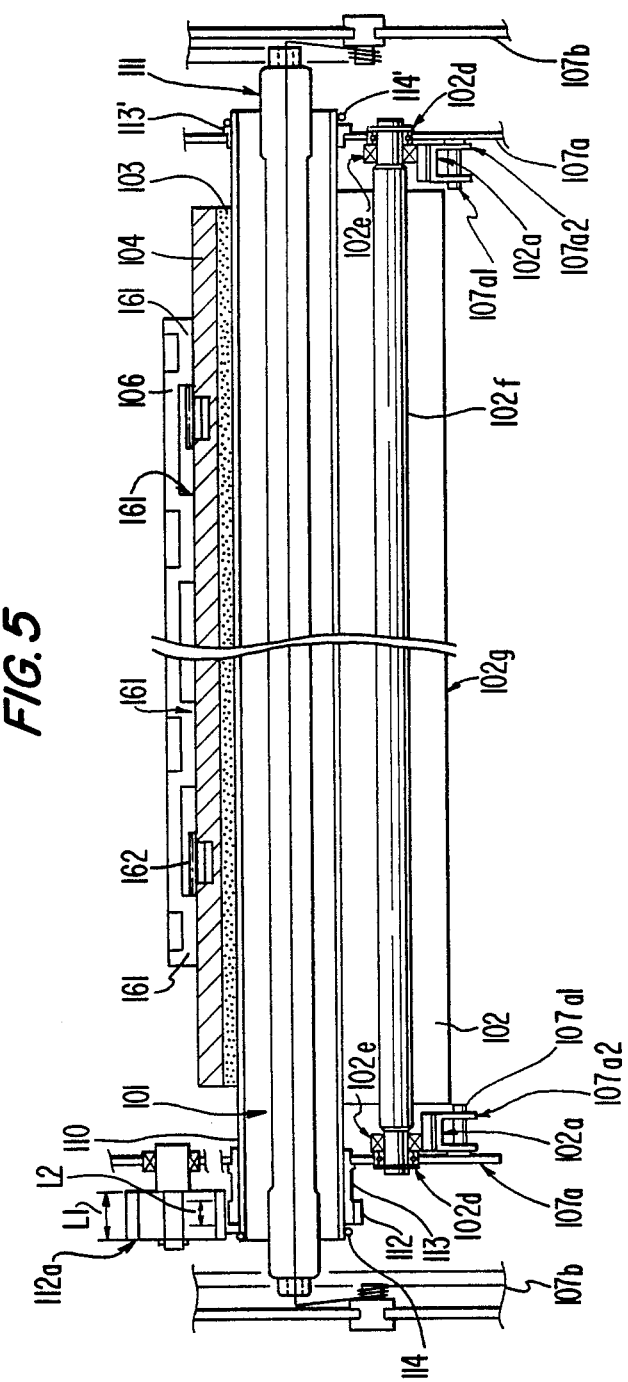
FIG. 5 is a cross-sectional view, taken along a line extending along the axes of rotation of the roller of the fixing unit of the present invention.

Referring to FIGS. 4 and 5, the structure of and function of the fixing unit 16 are hereinafter described in detail. The heated roller 101 includes a sleeve 101 that has, for example, a diameter of 30 mm and a length of 230 mm. Roller 101 is rotatably supported by guide plates 107a and 107a′ via bearings 113 and 113′ respectively. A gear 112 is installed on an end of the sleeve 110; and a heat lamp 111 is inserted through the sleeve 110 without touching the sleeve 110. Spring rings 114 and 114′ are provided on the ends of the sleeve 110 to prevent the sleeve 10 from being axially disengaged from the bearing 113 or 113′. The sleeve 110 rotates with the gear 112 driven by a gear 112a (FIG. 2(a)), which is installed on the lower frame 39. The sleeve 111 is heated typically to about 190° C. by the heat lamp 111, resulting in an axial expansion of 1~1.5 mm. Accordingly, the bearings 113 and 113′ allow the sleeve 110 to slide axially therein, and furthermore, width L1 of the gear 112a frame is wider than the width L2 of the gear 112 on the sleeve, so that complete engagement of the gears 112 and 112a is ensured at any temperature condition to prevent damage to the gears.

A pressure roller 102 is composed of an axle 102f and a rubber tube 102g mounted thereover. A silicone rubber is preferably chosen for the material of the rubber tube 102g because of its heat resistance and appropriate elastic properties. The ends of the axle 102f of the pressure roller 102 are supported in guide holes 107c provided on the guide plate 107a via bearings 102d. The width of the guide holes 107c slidably fits with the outer diameter of the bearings 102d while the length of the guide holes 107c extends toward the heated roller 101. A respective bearing 102e is provided on each end of the shaft 102f inside the bearings 102d. Thus, the pressure roller 102 can be pushed towards the heated roller 101 by two lever members 102a via the two bearings 102e. The described structure of the pressure roller 102 allows it to be of smaller size than conventional rollers, where the bearings for a hollow cylinder having a rubber tube thereover are provided inside the hollow cylinder, and the shaft which extends through the bearings is pushed towards the heat roller. In order to reduce the diameter of this conventional pressure roller, the thickness of the rubber tube and the diamter of the shaft must be reduced, resulting in a weak structure. Accordingly, the size reduction is limited.

Figure 6:
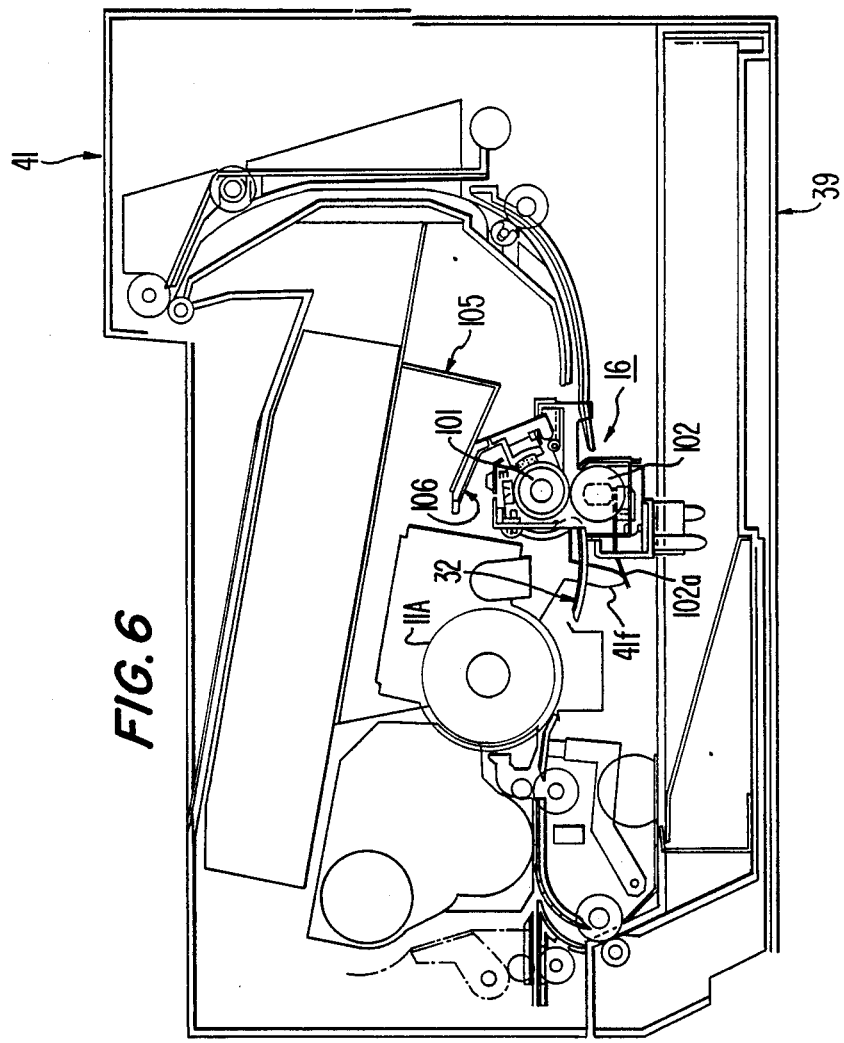
FIG. 6 is a side elevational schematic view illustrating the status of the fixing unit of the present invention when the upper and lower frames are in their closed condition.

Each of the lever members 102a is installed on a support member 107a2 which is rotatably mounted or a guide plate 107a via a pin 107a1. When the upper frame 41 is closed to engage with the lower frame 39 as shown in FIG. 6, each of two protrusions (or contact member) 41f provided on the upper frame moves downwardly, i.e., in the line 22, delete "for each lever member 102a to bent" and substitute direction of an arrow Z shown in FIG. 4, outer ends (contact elements) of the lever members 102a, then the support members 107a2 rotate around the pins 107a1 so as to push the shaft 102f up laterally towards the heat roller 101, i.e., to deliver the pressure of the upper fram to the shaft 102f. The material and size of the lever member 102a is chosen to have leaf spring action so the same to bend to maintain a proper pressure between the heated roller 101 and the pressure roller 102. In order to separate a sheet which may wrap around the heated roller 101, a plurality of separator nails 101a are rotatably mounted on pins 101b attached to case 16c of the fixing unit 16. The sharp edge of each separator nail 101a is always pressed to the surface of the heat roller 101 by a coil spring 101c.

Figure 9B:
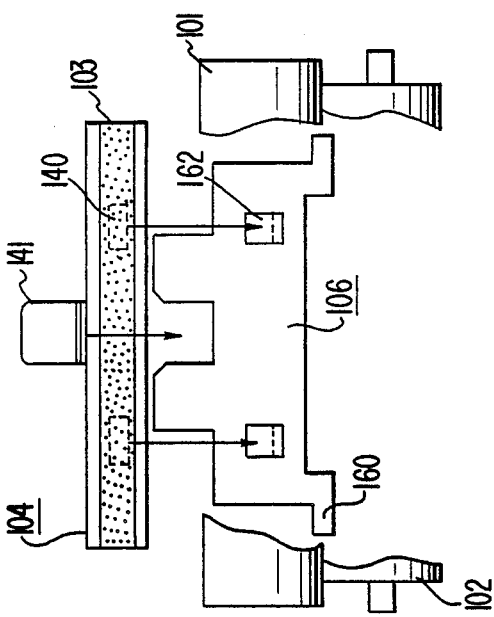
FIGS. 9 (a) and 9 (b) are cross-sectional views to illustrate the mutual relationship of the felt case, the buffer member, and rollers of the fixing unit of the present invention.
Figure 9A:
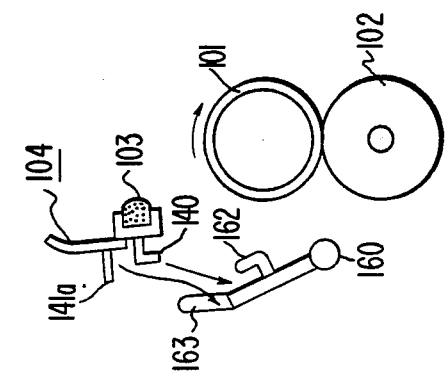

Even though the surface of the sleeve 110 is typically coated with silicone resin, there still may be an undesirable build up of toner sticking to the surface of the heated roller after the toner on the sheet is fixed. Therefore, a cleaning element 103, typically made of felt, is installed in a channel of a felt case 104 which extends longitudinally along the heat roller 101 and means are provided for pressing element 103 against the heat roller 101. Referring to FIGS. 8 and 9, the structure of the felt case 104 and its related parts is hereinafter described. On the back opposite side of case 104 from the channel having the felt element 103 therein, the felt case 104 is provided with a handle 141 mounted at the center of the length of the felt case 104 between two pockets 140. The pockets 140 may typically be located about one quarter of the length of the cleaner case from each end of the case, respectively. Each of the pockets 14 is adopted for engagement with an associated hook 162 provided on a buffer member 106, and at the same time, the handle 141 is adapted to be received in a gap 163 between the pressure plate means presented by two extending portions 106; and a projection 141a which extends orthogonally from the handle 141 rests over the central edge 163a of the gap 163, so that by gripping only the handle 141 the felt case 104 is easily mounted or demounted and its axial location is determined exactly. The buffer member 106 is made of plastic material, and it is further provided with two pins 160 at the bottom of the longitudinal ends respectively (see FIG. 8) forming a shaft facilitating rotation of the buffer member, four embossments 161 for pushing against the back of the felt case 104, and pressure plate means in the form of two pressure receiving plates 106′ at the top edge of member 106 opposite from the pins 160.

On the upper frame 41, contact member means in the form of two leaf springs 105 are provided so as to respectively contact push down on the pressure receiving plates 106′ of the buffer member 106 to cause the latter to rotate around the pins 160 frames 39 and 41 are in their closed condition, that is when the upper frame 39 is closed to engage the lower frame 41 as shown in FIG. 6. Then, the four embossments 161 which are essentially uniformly distributed along the length of the buffer member 106 push against the felt case 104 at the hatched portions (FIG. 8) on the back of the felt case 104. Accordingly, the cleaning felt 103 is pressed uniformly against the heated roller 101 along its entire length.

As described above, the fixing unit is intended to be replaceable and disposable by a user operating the apparatus. To this end the constitution of the fixing unit is simple and does not include any costly, mechanism for compressing the sheet.

When a sheet is jammed between the heat roller 101 and the pressure roller 102, the upper frame 39 and lowered frame 41 are moved into their opened disengaged condition, as shown in FIG. 7, where the pressure exerted on lever members 102a by the protrusions 41f is released and as a consequence the pressure to the pressure roller 102 imposed by the lever members 102a is released. Releasing of the pressure to the pressure roller 102 causes the pressure roller 102 to fall downwardly by its own weight and as a result the pressure biting the jammed sheet is released. Then, the jammed sheet may easily be removed by hand.

The procedure for replacing the cleaning felt 103 is also easy. When the upper frame 41 is opened from the lower frame 39 by rotation about the shaft 40, the pressure receiving plates 106' are released from the leaf springs 105. The buffer member 106 may then be rotated around the pins 160 so as to separate the cleaning felt 103 from the heated roller 101, and the felt case 104 may then be removed from the buffer member 106 by simply gripping and pulling up on the handle 141 using a single hand. The cleaning felt 103 in the channel of the felt case 104 may then be pulled out by hand for the replacement. Such simple procedure for replacing the cleaning felt is advantageous because it facilitates efficient servicing of the cleaning assemblage, and end that is desirable, because the operating life of the cleaning felt is shorter than that of other parts in the fixing unit 16.

For servicing of other parts of the fixing unit 16, the fixing unit 16 can be easily removed from the lower frame 39 by simply releasing the two screws 55a and 55b, and then pulling up on the fixing unit 16 by hand until the guide pins 39y, 16a and 16b are disengaged respectively from the holes 16f on the case 16c and the receptacle holes on the lower frame 39, as shown in FIG. 10(a), where, however, the guide pins, 16a and 16b are not shown. During this operation, the fixing unit 16 releases the pressure it normally exerts on leaf spring 32b connected to the second sheet guide 32. Then, since the second sheet guide 32 is rotatable around an axis 32a which is located between the center of gravity of the second sheet guide 32 and the fixing unit 16, guide 32 falls by its own weight so as to provide a free space where the fixing unit 16 may be received.

As the fixing unit 16 is installed onto the lower frame 39, the bottom edge 16c of the case pushes downwardly against leaf spring 32b so as to rotate the latter in a clockwise direction and push the second sheet guide 32 upwardly around the axis 32a until its reference edge 32c sits on a stage 16g of the case 16c, as shown in FIG. 10(b). Due to the spring action of the leaf spring 32b, the reference edge 32c is pressed against the stage 16g facilitating precise positioning of the second sheet guide 32 with respect to the heat roller 101 without any need for precisely specifying the shape and position of the fixing unit case 16c. Accordingly, the above-mentioned structure of the second sheet guide 32 requires no setting adjustment and allows for the efficient mounting and/or demounting of the fixing unit 16 relative to the lower frame 39.

Figure 11A:
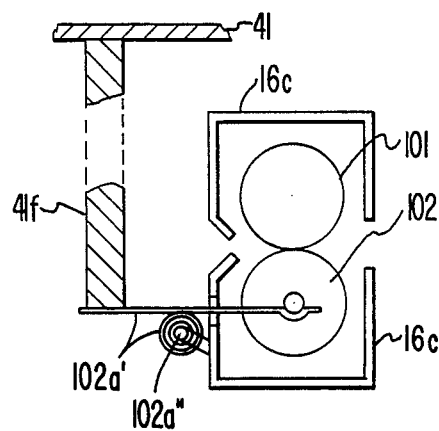
FIG. 11 (a) illustrates an alternatives preferred embodiment the present invention.
Figure 11B:
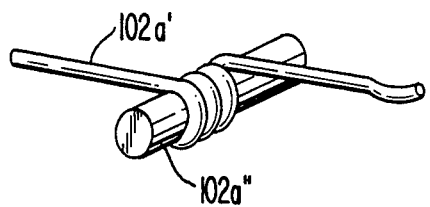

While in the above-described preferred embodiment a leaf spring is employed for the lever member 102a, a coil spring 102a' as shown in FIG. 11(b) may be alternatively employed. The coil spring 102a' may be rotatably mounted on an axle pin 102a'' which is installed on the case 16c of the fixing unit 16c as shown in FIG. 11(a). One end of the coil spring 102a' is pushed by the protrusion 41f from the upper frame 41 and then, the other end of the spring coil 102a' pushes via the bearing 102e not shown in FIG. 11(a) the pressure roller 102 upwards. Coil spring 102a' is suitable to deliver an appropriate pressure to the pressure roller.

In the above-described preferred embodiment the heated roller 101 is disposed in the upper position and the pressure roller 102 is disposed in the lower position. However, it will be apparent to those skilled in the art that the present invention is applicable also to situations where the locations of the heated roller and the pressure roller are interchanged and where the rollers are both pressure rollers, that is, where the fixing unit does not include a heated roller.

In the above-described embodiments of the present invention, the pressure roller falls down by its own weight when the upper frame is open; however, it is possible to provide a spring to separate the rollers from one another. With such spring it would be possible for one of the roller to be moved upwardly from the other roller when the pressure to the rollers from the upper frame is released.

The fixing unit according to the present invention is an inexpensive, structure, i.e., a compact and simple structure, wherein the sheet compressing mechanism of the fixing unit is such that the rollers receive only a lateral pressure and jammed sheet are easily removed from the fixing unit whereby to permit less experienced persons to use the apparatus and to easily and efficiently mount and/or demount the fixing unit relative to the frame, resulting in the economical use of maintenance of the apparatus.

The many features and advantages of the invention are apparent from the foregoing detailed specification and thus, it is intended by the appended claims to cover all such features and advantages of the system which fall within the true spirit and scope of the invention. Furthermore, since numerous modifications and changes might readily occur to those skilled in the art, it is not desired to limit the invention to the exact construction and operation shown and described, and accordingly, suitable modifications and equivalents may be made within the scope of the invention.

What we claim is:

1. Image forming apparatus for forming an image on an image recording sheet, said apparatus comprising:
   upper and lower frames;
   hinge means hingedly interconnecting the frames and facilitating relative movement thereof between opened and closed conditions;
   a toner fixing unit including a base structure, a pair of elongated rollers rotatably mounted on said base structure and disposed in parallel contacting relationship for pinching an image recording sheet carrying a toner image therebetween during rotation of the rollers, and pressure means including a contact element and operable in response to a pressing force applied to the contact element for pressing said rollers toward one another during said rotation thereof to fix the toner image on the image recording sheet;
   fastening means for detachably mounting the toner fixing unit on one of the frames; and
   a first contact member mounted on the other frame in a position for contacting said contact element to apply said pressing force to the contact element when said frames are in their closed condition and to release said pressing force when said frames are in their open position.

2. Apparatus as set forth in claim 1, wherein a first one of the rollers is a heated roller for heating the toner image on the image recording sheet during rotation of the rollers.

3. Apparatus as set forth in claim 2, wherein a second one of the rollers is a pressure roller comprising an elastic material mounted on a rigid axle.

4. Image forming apparatus for forming an image on an image recording sheet, said apparatus comprising:
   upper and lower frames;

hinge means hingedly interconnecting the frames and facilitating relative movement thereof between opened and closed conditions;

a toner fixing unit including a base structure, a pair of elongated rollers rotatably mounted on said base structure and disposed in parallel contacting relationship for pinching an image recording sheet carrying a toner image therebetween during rotation of the rollers, one of said rollers being mounted for movement toward and away from the other roller and for normally becoming separated from the other roller by gravity when unsupported, and an elongated, resilient, bendable spring member having a contact element at one end thereof and a pressure imposing portion at the other end thereof, said spring member being operable in response to a lateral pressing force applied to the contact element for urging the pressure imposing portion laterally in a direction to press said one roller toward the other roller during said rotation thereof to fix the toner image on the image recording sheet;

fastening means for detachably mounting the toner fixing unit on one of the frames; and a first contact member mounted on the other frame for contacting said contact element and applying said lateral pressing force thereto when said frames are in their closed condition.

5. Apparatus as set forth in claim 4, wherein said other roller is a heated roller for heating the toner image on the image recording sheet during rotation of the rollers.

6. Apparatus as set forth in claim 5, wherein said one of the rollers is a pressure roller comprising an elastic material mounted on a rigid axle.

7. Apparatus as set forth in claim 6, wherein said axle is elongated and has spaced ends, said ends of the axle being mounted in respective bearing elements, said bearing elements being mounted on said base structure for movement toward and away from the axis of rotation of said heated roller, said pressure imposing portion being operable to push one of said bearing elements toward said axis of rotation of the heated roller when said contact member and said contact element are in said pressing force applying relationship.

8. Apparatus as set forth in claim 4, wherein said spring member comprises a leaf spring.

9. Apparatus as set forth in claim 4, wherein said spring member is coiled around an axle pin.

10. Image forming apparatus provided with upper and lower frames, hinge means hingedly interconnecting the frames and facilitating relative movement thereof between opened and closed conditions, and a toner fixing unit detachably mounted on one of the frames, said fixing unit comprising:

a base structure;

a pair of elongated rollers rotatably mounted on said base structure and disposed in parallel contacting relationship for pinching an image recording sheet carrying a toner image therebetween during rotation of the rollers, one of said rollers being a heated roller for heating the toner image on the image recording sheet during said rotation of the rollers;

pressure means including a contact element and operable in response to a pressing force applied to the contact element for pressing said rollers toward one another during said rotation thereof to fix the toner image on the image recording sheet;

a cleaning felt element for wiping said heated roller to remove therefrom residual toner remaining on the heated roller after the toner image is fixed on the recording sheet, said felt element extending along said heated roller in contact with the surface of the latter;

a felt case having a channel containing said cleaning felt element, said felt case having at least two pockets on the side thereof which is opposite from said channel, said pockets each having an opening facing in the direction of rotation of said heated roller relative to said felt element, said felt case having a handle member attached centrally of said opposite side of the felt case;

a buffer member having hook means for engaging in said pockets to support said felt case and a plurality of embossments adapted and disposed for pressing against said opposite side of the felt case when the hook means are engaged in said pockets, said buffer member also having pressure plate means disposed on the opposite side of the buffer member from the embossments; and means mounting said buffer member on the base structure for swinging about an axis toward and away from said heated roller, said apparatus including a first contact member mounted on the other frame for contacting said contact element and applying said pressing force thereto when said frames are in their closed condition, said apparatus having second contact member means mounted on the other frame for contacting said pressure plate means of the buffer member when said frames are in their closed condition, to push the embossments against the felt case and thereby push the felt element uniformly along its length against the heated roller.

11. Apparatus as set forth in claim 10, wherein said pressure plate means includes at least two separate pressure plates that are spaced apart longitudinally of the heated roller presenting a gap therebetween, said second contact member means including a contact member for each pressure plate.

12. Apparatus as set forth in claim 11, wherein said handle member is received in said gap when the hook means are engaged in said pockets whereby to determine the longitudinal position of the felt case relative to the heated roller.

13. Image forming apparatus provided with upper and lower frames, hinge means hingedly interconnecting the frames and facilitating relative movement thereof between opened and closed conditions, and a toner fixing unit detachably mounted on one of the frames, said fixing unit comprising:

a base structure;

a pair of elongated rollers rotatably mounted on said base structure and disposed in parallel contacting relationship for pinching an image recording sheet carrying a toner image therebetween during rotation of the rollers; and pressure means including a contact element and operable in response to a pressing force applied to the contact element for pressing said rollers toward one another during said rotation thereof to fix the toner image on the image recording sheet, said apparatus including a first contact member mounted on the other frame for contacting said contact element and applying said pressing force thereto when said frames are in their closed condition, said apparatus further comprising a sheet guide for supporting and guiding an image recording sheet having a toner image thereon between said first and second rollers, said sheet guide being rotatably supported by a sheet guide axle arranged in parallelism relative to said rollers, said sheet guide axle being located beneath the center of gravity of said sheet guide and said fixing unit in a position such that when said fixing unit is removed from the apparatus said sheet guide falls from its normal operating position to a position opposite from the space for said fixing unit to provide a path for said fixing unit to be mounted on said one frame, said fixing unit including a surface positioned for engaging and pushing against a spring member extending from a portion of said sheet guide that is lower than said sheet guide axle when the fixing unit is inserted into said space so as to rotate said sheet guide about said axle thereof and into its normal operating position adjacent said fixing unit, said fixing unit having a reference edge on said base structure, said sheet guide being held against said reference edge by action of said spring member, whereby said sheet guide is precisely positioned with respect to said fixer unit.

14. Image forming apparatus provided with upper and lower frames, hinge means hingedly interconnecting the frames and facilitating relative movement thereof between opened and closed conditions, and a toner fixing unit mounted on one of the frames, said fixing unit comprising:

a base structure;

a pair of elongated rollers rotatably mounted on said base structure and disposed in parallel contacting relationship for pinching an image recording sheet carrying a toner image therebetween during rotation of the rollers, one of said rollers being a heated roller for heating the toner image on the image recording sheet during said rotation of the rollers;

pressure means including a contact element and operable in response to a pressing force applied to the contact element for pressing said rollers toward one another during said rotation thereof to fix the toner image on the image recording sheet;

a cleaning felt element for wiping said heated roller to remove therefrom residual toner remaining on the heated roller after the toner image is fixed on the recording sheet, said felt element extending along said heated roller in contact with the surface of the latter;

a felt case having a channel containing said cleaning felt element, said felt case having at least two pockets on the side thereof which is opposite from said channel, said pockets each having an opening facing in the direction of rotation of said heated roller relative to said felt element, said felt case having a handle member attached centrally of said opposite side of the felt case;

a buffer member having hook means for engaging in said pockets to support said felt case and a plurality of embossments adapted and disposed for pressing against said opposite side of the felt case when the hook means are engaged in said pockets, said buffer member also having pressure plate means disposed on the opposite side of the buffer member from the embossments; and means mounting said buffer member on the base structure for swinging about an axis toward and away from said heated roller, said apparatus including a first contact member mounted on the other frame for contacting said contact element and applying said pressing force thereto when said frames are in their closed condition;

said apparatus having second contact member means mounted on the other frame for contacting said pressure plate means of the buffer member when said frames are in their closed condition, to push the embossments against the felt case and thereby push the felt element uniformly along its length against the heated roller, said cleaning felt member, said felt case, said buffer member and said mounting means for the buffer member together presenting a roller cleaning assemblage that is detachable from the remaining components of the fixing unit.

* * * * *

UNITED STATES PATENT AND TRADEMARK OFFICE
CERTIFICATE OF CORRECTION

PATENT NO. : 4,965,640
DATED : October 23, 1990
INVENTOR(S) : Shinichi Watarai, Makoto Inoue and Keiji Ohyabu It is certified that error appears in the above-identified patent and that said Letters Patent is hereby corrected as shown below:

Column 1, line 9, "used" should be --for use--;
         line 38, ". Of" should be --of--.

Column 2, line 56, after "recording" insert --apparatus--;
         line 58, "imate" should be --image--.

Column 3, line 16, "relatioships betw-" should be --relationships bet- --;
         line 17, delete the semicolon ";";
         line 18, "detachement" should be --detachment--;
         line 19, "frame." should be --frame,--;
         line 35, shwon" should be --shown--;
         line 41, "laten" should be --latent--;
         line 44, "power" should be --powder--;
         line 47, delete "a" and substitute --an--;
         line 51, electras-" should be -- electrosta- --;
         line 54, after "11A," insert --as--;
         line 56, "herebetween" should be --therebetween--;
         line 65, "quide" should be --guide--.

Column 4, line 2, "teh" should be --the--;
         line 3, "of" should be --to--;
         line 11, after "sheet" insert --is--;
         line 26, "invention" should be --insertion--;

UNITED STATES PATENT AND TRADEMARK OFFICE
CERTIFICATE OF CORRECTION

PATENT NO. : 4,965,640

DATED : October 23, 1990

INVENTOR(S) : Shinichi Watarai, Makoto Inoue and Keiji Ohyabu

It is certified that error appears in the above-identified patent and that said Letters Patent is hereby corrected as shown below:

Column 4, line 28, after "52b" insert a period --.--;
         line 30, "facilate" should be --facilitate--;
         line 32, after "and" insert --the--;
         line 33, "engagment" should be --engagement--;
         line 40, "remanins" should be --remains--;
         line 43, after "condition" insert a comma --,--;
         line 47, "frema" should be --frame--;
         line 65, "facilitable" should be --facilitate--.

Column 5, line 12, delete the semicolon ";";
         line 15, "10" should be --110--;
         line 52, "or" should be --on--;
         line 57, delete "line 22, delete "for each lever member 102a to";
         line 58, delete "bent" and substitue";
         line 59, after "4," insert --to contact and push against the--;
         line 63, "fram" should be --frame--;
         line 65, after "so" insert --that--.

Column 6, line 26, delete the semicolon ";";
         line 43, after "106'," insert a comma --,--;
         line 59, "lowered" should be --lower--.

Column 7, line 25, after "pins" delete the comma ",";
         line 57, delete the comma ",".

UNITED STATES PATENT AND TRADEMARK OFFICE
CERTIFICATE OF CORRECTION

PATENT NO. : 4,965,640

DATED : October 23, 1990

INVENTOR(S) : Shinichi Watarai, Makoto Inoue and Keiji Ohyabu

It is certified that error appears in the above-identified patent and that said Letters Patent is hereby corrected as shown below:

Column 8, line 19, after "used" delete "of" and substitute --and--.

Signed and Sealed this

Ninth Day of June, 1992

Attest:

DOUGLAS B. COMER

*Attesting Officer*  *Acting Commissioner of Patents and Trademarks*